United States Patent [19]

Nelson et al.

[11] Patent Number: 4,980,137

[45] Date of Patent: Dec. 25, 1990

[54] PROCESS FOR NOX AND CO CONTROL

[75] Inventors: Sidney G. Nelson, Hudson; Brian W. Nelson, Kent, both of Ohio

[73] Assignee: Sanitech, Inc., Twinsburg, Ohio

[21] Appl. No.: 331,850

[22] Filed: Apr. 3, 1989

[51] Int. Cl.$^5$ .................... B01J 8/00; C01B 21/00; C01B 31/18; C10K 1/20
[52] U.S. Cl. .................................... 423/239; 423/247
[58] Field of Search .................. 423/239, 239 A, 247, 423/235

[56] References Cited

U.S. PATENT DOCUMENTS 3,576,596  4/1971  Kranc et al. .................... 423/239 X
4,806,320  2/1989  Nelson ............................. 423/239

*Primary Examiner*—Gregory A. Heller

[57] ABSTRACT

An improved process is described for reducing the levels of nitrogen oxides and carbon monoxide present in flue gases. The process consists of preparing a bed of expanded vermiculite, expanded perlite, or borosilicate glass wool and passing a flue gas containing nitrogen oxides and carbon monoxide through the bed, whereas the vermiculite, perlite, or glass wool making up the bed material serves as a catalyst for the reduction of the nitrogen oxides to gaseous nitrogen and oxygen and the reduction of carbon monoxide to carbon and oxygen, the carbon being deposited on the bed particles. After the deposition of carbon, the bed material is then exposed to an oxidizing gas stream, during which time the deposited carbon is converted to carbon dioxide and the bed material is conditioned to accept flue gas again.

6 Claims, No Drawings

PROCESS FOR NOX AND CO CONTROL

TECHNICAL FIELD

This invention relates to a pollution control process and more particularly to an improved process that reduces and eliminates nitrogen oxides and carbon monoxide that occur in flue gases generated by stationary and mobile sources.

BACKGROUND OF THE INVENTION

Nitrogen oxide emissions, principally nitrogen dioxide ($NO_2$) and nitric oxide (NO) and referred to collectively as NOx, are acutely toxic air pollutants. Recent research findings link NOx to a broad range of air pollution problems, including acid deposition, the atmospheric production of photochemical ozone (the brownish haze in the air commonly called smog), health-threatening nitrate particles that also limit visibility, and the formation of toxic nitrogen compounds, such as nitrosamines. Annually, in the U.S. alone, over 20 million tons of NOx are emitted into the atmosphere. Carbon monoxide (CO) is also an acutely toxic air pollutant. It is the most commonly occurring air pollutant and can often be lethal. CO emissions to the atmosphere exceed all other pollutants combined. Major sources of these emissions are stationary sources, such as boilers, gas turbines, internal combustion engines, diesel engines, and incinerators, and mobile sources, such as automobiles.

In recent years, there has been an increased awareness of these emissions. As a result, the U.S. Environmental Protection Agency and others have promulgated and proposed standards to define the limits of NOx and CO permitted from various sources.

Three approaches can be taken to reduce NOx and/or CO emissions. These are: (1) Making changes before combustion; (2) Making modifications during combustion; and (3) Adding controls after combustion. Typical precombustion approaches are fuel switching, emulsifying the fuel with water, and denitrifying the fuel. Typical combustion modification techniques are changing stoichiometry, reducing temperature, and reducing residence time. Adding controls after combustion is generally referred to as flue-gas treatment.

NOx reduction during combustion has been employed since the early 1970's to obtain limited NOx emission reductions. It is the most common NOx emission reduction approach being used today to achieve moderate control. To obtain higher levels of NOx reduction, it is generally necessary to employ a flue-gas treatment approach, or a combination of approaches.

Flue-gas treatment processes are of two types, dry processes and wet processes. Some processes are designed for the simultaneous removal of NOx and $SO_2$. Many of the flue-gas treatment processes for NOx have been developed in Japan, where NOx emissions limits are generally stricter than in the United States.

Dry flue-gas treatment processes are normally preferred over wet processes because (1) they usually involve less equipment, and (2) they generally produce less waste that requires disposal. Most dry processes, however, share one characteristic with wet processes: they are both very expensive. A number of dry processes are either commercially available or are well along in development. They range from catalytic and noncatalytic reduction to absorption processes and irradiation with electron beams.

Today, the most popular flue-gas treatment process for NOx by far, at least for stationary sources, is selective catalytic reduction (SCR). In SCR, ammonia is used as a reducing agent. In the process, NOx is reduced to $N_2$ and $H_2O$ by ammonia at 300° to 400° C. in the presence of a catalyst. Ammonia is an acceptable reducing agent for NOx in combustion gases because it selectively reacts with NOx while other reducing agents, such as $H_2$, CO, and methane, readily react with $O_2$ in the gases. The catalysts are normally precious metals, such as platinum, rhodium, palladium, ruthenium, osmium or iridium, or zeolites.

Major problems identified with present SCR systems include: (1) poisoning, masking, and thermal aging of the catalysts; (2) ammonia slip (some ammonia invariably passes through the catalyst bed unreacted and out with the flue gas); (3) difficult process control; (4) limited temperature range for satisfactory NOx conversion; and (5) high costs. Poisoning, masking, and thermal aging can destroy the catalyst's activity. Poisoning is the chemical reaction of components in the system with the catalyst itself. The reaction is often irreversible. Excessive amounts of sulfur, phosphorus, and certain metals, for example, can poison catalysts. Masking is caused by a gradual accumulation of non-combusted, solid material on the catalyst's surface. It prevents gases from contacting the catalyst's surface. Thermal aging is a sintering process. Precious metal catalysts are generally deposited as extremely fine particles on the surface of a carrier phase. With time, these fine particles migrate along the surface and fuse with other particles forming larger particles. In doing so, their total surface areas decrease, along with their activity.

Ammonia slip can be a serious problem. It can occur at ammonia:NOx ratios well below 1.0. An ammonia:NOx ratio of 1.0 is the amount of ammonia required stoichiometrically to react precisely with all the NOx present in a gas. Because it is generally impossible to achieve 100 percent reaction at a ratio of 1.0, to achieve near 100 percent conversion, systems must operate at higher ratios and subsequently they show major ammonia slip. To operate at 15 percent below a ratio of 1.0 (which is common practice) means that only enough ammonia is available to react with 85 percent of the NOx present.

Control systems for present SCR systems tend to be elaborate and costly, and generally they add significant pressure-drop penalties. Also, in most applications, the compositions and temperatures of the flue gas vary to a degree. For conventional SCR systems, as the NOx level in the gas changes, the amount of ammonia introduced into the flue gas stream must be adjusted. If these adjustments are not made, either major ammonia slip occurs or NOx reduction performance falls off. Also, because most NOx catalysts only perform satisfactorily within narrow temperature ranges, heat exchangers to remove heat and burners to add heat are often employed to bring the flue gas temperature into the desired range. Controls, therefore, are critical. The temperature, the ammonia level and the NOx level of the gas stream must be constantly monitored, and changes must be communicated to the gas heating and cooling systems and to ammonia-addition equipment so adjustments can be made accordingly.

Present SCR systems are costly because they require expensive catalysts, because they require expensive control systems, and because catalyst regeneration, where possible, is an expensive procedure (Acid treatment is a common regeneration procedure).

In U.S. Pat. No. 4,806,320, the Inventor, S. Nelson, describes a process in which expanded vermiculite, a low-cost mineral, is used in place of expensive, more conventional catalysts in an SCR process. The process, which involves the use of ammonia or methane in combination with vermiculite, performs well in reducing the NOx levels of flue gases.

In more recent SCR research work supported by the U.S. Air Force under SBIR Contract FO8635-88-C-0262, the Inventors made three surprising, unexpected discoveries: (1) That very attractive NOx reductions, up to 100 percent, can be obtained with the use of expanded vermiculite alone, with no need whatsoever for ammonia or methane gas injections; (2) That these high reductions can be obtained over a wide range of temperatures, 20° to 600° C.; and (3) That CO is reduced, in addition to NOx, during processing and that the CO reduction products are gaseous oxygen and solid carbon, the latter depositing for the most part on the vermiculite particles. Further, it was discovered that over time these carbon deposits reduced the NOx and CO conversion efficiencies, but that good conversion efficiencies could be recovered simply by heating the vermiculite catalyst for a short time in air or in flue gas supplemented with air at temperatures above 450° C. When this was done, the carbon was burned off as carbon dioxide ($CO_2$). In addition, it was found that two other materials, expanded perlite (a low-cost mineral similar to vermiculite) and borosilicate glass wool can be substituted for vermiculite resulting in NOx and CO reductions almost as good as those achieved with vermiculite. Further, it was found surprisingly that by heating expanded vermiculite in air at a temperature above 300° C. just prior to its contact with a flue gas markedly improves both NOx and CO conversion efficiencies.

The ramifications of these discoveries are significant. The use of vermiculite alone, or alternately perlite or borosilicate glass wool, means that a very simple process can be used to reduce simultaneously the NOx and CO levels of flue gases. It means, because no gaseous ammonia is required for NOx reduction, the possibility of ammonia slip is totally eliminated, that the expensive controls required in conventional SCR systems are not needed, and that gas-temperature adjustment equipment may not be required.

DETAILED DESCRIPTION OF INVENTION

This invention relates to an improved dry method for destroying the nitrogen oxides and the carbon monoxide that may be present in flue gases by converting them effectively to elemental nitrogen, elemental oxygen and carbon dioxide. The method consists of three steps: (1) preparing a catalyst bed of expanded vermiculite, expanded perlite, or borosilicate glass wool and placing this bed inside a flue gas duct or inside a chamber that is contiguous with a flue gas duct; (2) passing a flue gas containing NOx and CO through this bed, and (3) periodically passing an oxidizing gas through this bed to convert the carbon deposited on the catalyst bed particles in Step 2 to carbon dioxide. During Step 2, nitrogen oxides are converted to elemental nitrogen and elemental oxygen and carbon monoxide is converted to elemental carbon and elemental oxygen. The nitrogen and oxygen leave the catalyst bed with the exiting gas, while the carbon generally remains in the bed. Step 2 is carried out with flue gases in the temperature range of 20° to 600° C.

Step 3 is performed preferably at temperatures of 450° C. or higher with the gas having an oxygen concentration preferably of 10 percent or more by weight. After Step 3, the catalyst bed is generally free of elemental carbon and can accept flue gas again with maximum reductions of NOx and CO. It should be noted that Steps 2 and 3 can be carried out simultaneously with good results within the narrow temperature range 450° to 600° C., if desired.

Of the three catalytic bed materials, vermiculite is preferred because it generally results in higher percentage NOx and CO reductions than do the other two materials. All three materials, however, are effective catalysts for NOx and CO reduction over the temperature range 20° to 600° C., reducing the total NOx concentrations of flue gases generally over 55 percent and CO concentrations over 80 percent for long periods of time.

The improved method was found to be effective with flue gases having a wide range of compositions and velocities. It was effective with both fuel-rich (reducing) and fuel-poor (oxidizing) flue gases. It reduced NOx levels very effectively in flue gases having NOx concentrations of 5 to 600 ppm, with higher percentage reductions generally occurring with higher initial NOx concentrations and with very low concentrations, less than 50 ppm. It also reduced CO levels very effectively in flue gases having CO concentrations up to 2000 ppm. The improved method is probably effective outside these composition ranges, but our tests did not involve gases with NOx and CO levels above 600 ppm and 2000 ppm, respectively.

No species in the flue gas or in the catalyst system was observed to poison the catalyst, as is often the case with conventional catalysts. No significant changes in NOx removal efficiency were noted over the space velocity range 5,000 to 60,000 bed volumes per hour.

The particle size of the expanded vermiculite, expanded perlite, or borosilicate glass wool does not significantly affect NOx and CO conversion efficiency, although slightly decreased efficiencies occur with very coarse (greater than 10 mm) particles.

Vermiculite, Perlite, and Borosilicate Glass Wool as Catalysts

The use of expanded vermiculite, expanded perlite, or borosilicate glass wool by itself with no chemical additions to convert NOx to nitrogen and oxygen is a new concept. The use of these materials to convert CO to carbon and oxygen and ultimately to $CO_2$ is also new. The only prior art relating to the use of these materials as catalysts appears to be the Inventor's U.S. Pat. No. 4,806,320, relating to vermiculite with ammonia or methane for NOx control, and referred to earlier. No references were found relating to the use of perlite nor to borosilicate glass wool as a catalyst for NOx or CO control.

Vermiculite and perlite have been suggested as carriers or support phases for other materials in the past. Evanshen in U.S. Pat. No. 3,757,489 describes the treatment of flue gases with polyvinylpyrrolidone with or without the addition of copper or silver nitrate or sulfate. He suggests suspending the materials on a carrier, such as vermiculite. Holter, et al, in U.S. Pat. Nos. 3,882,221, 4,061,476 and 4,201,721 describe processes in which waste steel plant dust, along with other steel plant wastes, coated onto perlite or vermiculite carriers can be used to treat waste gases to remove $SO_2$. Vermiculite and perlite have been employed as a carrier for other materials in applications outside of flue-gas treatment. For example, they have been and are used as carriers for nitrates and phosphates, where the combinations are employed as slow-release fertilizers.

Although borosilicate glass wool has not be used in flue-gas applications in the past, other forms of silica have. Kitagawa, in U.S. Pat. No. 3,382,033, for example, describes a dry method for removing nitrogen oxides from a waste gas involving inorganic salts of a hydroxy acid or inorganic oxides, and, in particular, $FeSO_4$, $Na_2O_2$ and $NaClO_2$, adsorbed onto particles of silica gel or alumina gel, which perform as a carrier phase. A process developed by Pike, U.S. Pat. No. 2,647,822, relates to a system and apparatus for the recovery of nitric oxide from gas mixtures by using silica gel as a catalyst bed. Harris, et al, in U.S. Pat. No. 3,459,494, describe a process for converting a nitrogen oxide stream to nitrogen and oxygen in which a catalyst of an oxide or silicate of an alkali or alkaline earth metal, such as sodium, potassium, cesium, lithium, rubidium, barium, calcium, strontium, or combinations thereof, supported on a suitable carrier phase of Alundum cement, porcelain, silica or alumina is employed. The catalyst is contacted at 800° to 1000° C. with the nitrogen oxide stream, and the hot reaction gases then pass through a heat exchanger to preheat incoming gas and the oxygen and nitrogen products are subjected to a suitable absorbing column to remove trace amounts of unreacted nitrogen oxides. In a process by Veal, U.S. Pat. No. 3,050,363, a gas containing minor proportions of nitric oxide is oxidized to nitrogen dioxide by contacting the gas in the presence of oxygen with a catalyst of an anhydride of an inorganic acid, such as chromium trioxide or iodine pentoxide, attached to a silica gel support. The Inventors examined other forms of silica for the removal of NOx and CO from flue gases (in addition to borosilicate glass wool) and found these other materials to be generally ineffective as catalysts, when used alone.

References will now be made to five examples that deal with embodiments of the present invention.

EXAMPLE 1

The ability of six materials to reduce NOx to nitrogen and CO to carbon and oxygen was evaluated by exposing 10-cm beds of the materials to a flue gas having a NOx concentration of about 200 ppm and a CO concentration of about 400 ppm at temperatures of 204° C. (400° F.) and 316° C. (600° F.). The NOx consisted of about 95 percent NO and 5 percent $NO_2$. The six materials were coarse-grade expanded vermiculite, expanded perlite, activated carbon, borosilicate glass wool, fine silica sand, and silica spheres (10 mm). All materials were used in the conditions in which they were received from suppliers. A flue gas space velocity of 30,000 bed volumes per hr was employed. The results of these runs are given in Table I. At 204° C., four of the materials, vermiculite, perlite, activated carbon, and borosilicate wool, showed the ability to reduce both NOx and CO. At 316° C., the activated carbon ignited and burned. Of the six materials examined, expanded vermiculite displayed the best NOx reduction performance.

EXAMPLE 2

The NOx reduction performances of as-received expanded vermiculite and perlite were compared with those of a commercial SCR catalyst. Runs with and without gaseous ammonia additions to the flue gas stream were carried out. The SCR catalyst consisted of a honeycomb support, a carrier phase, and a zeolite. When ammonia was used, an $NH_3/NOx$ ratio of 1.0 was employed. The relative performances of the materials at four selected temperatures are shown in Table II. The results of these runs showed that: (1) The commercial catalyst, when employed with ammonia, was effective in converting NOx to nitrogen over a narrow high-temperature range, about 316° to 500° C.; without ammonia injection, it was not particularly effective at any temperature; (2) Vermiculite (and perlite to a lesser extent) was effective at all temperatures that were studied, both with and without ammonia present; (3) The injection of ammonia only marginally improved the NOx conversion efficiency of vermiculite and perlite.

TABLE I

| | NOx Conversion Efficiency (%) | |
|---|---|---|
| Bed Material | At 204° C. | At 316° C. |
| Empty Bed | 0.0 | 0.0 |
| Vermiculite | 57.5 | 66.0 |
| Perlite | 51.0 | 57.0 |
| Activated Carbon | 49.0 | Ignited |
| Borosilicate Wool | 32.5 | 52.5 |
| Silica Sand | 0.0 | 0.0 |
| Silica Spheres | 0.0 | 0.0 |

| | CO Conversion Efficiency (%) | |
|---|---|---|
| Bed Material | At 204° C. | At 316° C. |
| Empty Bed | 0.0 | 0.0 |
| Vermiculite | 100.0 | 100.0 |
| Perlite | 100.0 | 100.0 |
| Activated Carbon | 54.3 | Heavy CO Produced |
| Borosilicate Wool | 29.7 | 46.7 |
| Silica Sand | 0.0 | 0.0 |
| Silica Spheres | 0.0 | 0.0 |

TABLE II

| With Ammonia Injection | | | | |
|---|---|---|---|---|
| | NOx Conversion Efficiency (%) | | | |
| Bed Material | 22° C. | 204° C. | 316° C. | 500° C. |
| Vermiculite | 55.0 | 59.5 | 67.5 | 74.0 |
| Perlite | NR (Not Run) | 56.5 | 60.0 | NR |
| Commercial Catalyst | 0.0 | 8.0 | 59.0 | 95.5 |
| With No Ammonia Injection | | | | |
| | NOx Conversion Efficiency (%) | | | |
| Bed Material | 22° C. | 204° C. | 316° C. | 500° C. |
| Vermiculite | 40.0 | 57.5 | 66.0 | 73.0 |
| Perlite | Nr | 51.0 | 57.0 | 63.0 |
| Commercial Catalyst | 0.0 | 0.0 | 0.0 | 35.0 |

EXAMPLE 3

The effects of changes in flue gas velocity on NOx conversion efficiency for beds of expanded vermiculite and expanded perlite (no ammonia additions) were examined in a separate series of experiments. For these tests, beds of different sizes were studied. Gas velocities were monitored with a conventional gas flowmeter and with a Kurz air velocity meter. Beds were exposed to a 315° C. flue gas containing 150 ppm NOx at space velocities of 5,000, 20,000, 30,000, 40,000 and 60,000 bed volumes per hour. The results of these tests showed essentially the same NOx conversion efficiencies at all space velocities for each material, 66 percent for vermiculite and 57 percent for perlite.

EXAMPLE 4

To determine if vermiculite particle size or the level of NOx in the flue gas has any effect on NOx conversion efficiency for vermiculite beds (with no ammonia additions), several flue gas runs were performed with three different grades of as-received vermiculite: Fine grade (2 mm or less); Coarse grade (4 mm to 8 mm); and Premium grade (10 mm or more). Although most runs were performed with a 204° C. flue gas having about 150 ppm NOx, one run was performed with a 204° C. gas having 433 ppm NOx. The results of these runs are given in Table III. These results showed that Fine and Coarse grades of vermiculite demonstrated better performance than did the Premium (extremely coarse) grade. They also showed that a higher efficiency was obtained with the flue gas with a higher NOx level.

TABLE III

| Vermiculite Grade | NOx Level (ppm) | NOx Conversion Efficiency (%) |
|---|---|---|
| Fine | 148 | 59.5 |
| Coarse | 180 | 57.5 |
| Coarse | 433 | 73.0 |
| Premium | 150 | 41.5 |

EXAMPLE 5

The regenerability of the vermiculite catalyst and the usefulness of a pre-treatment step prior to its initial use were demonstrated in the following experiment. Two 10-cm beds of vermiculite were initially prepared. One was made up of expanded vermiculite as it was received from the manufacturer; the second was prepared from expanded vermiculite that was heated in air at 500° C. for 30 min. prior to its use. Each of these beds was exposed to a 300° C. simulated flue gas containing 200 to 800 ppm NOx for 3 hr. at a space velocity of 30,000 bed volumes per hr. Following exposure, the beds were regenerated in place by heating them at 500° C. for 20 min. while air was passed through the beds. The two beds were then re-exposed to simulated flue gases as before. The results of these experiments are shown in Table IV.

TABLE IV

| Catalyst | Average NOx Conversion (%) |
|---|---|
| As-Received Vermiculite | 68.0 |
| Pre-Treated Vermiculite | 80.3 |
| Regenerated As-Received Vermiculite | 100.0 |
| Regenerated Pre-Treated Vermiculite | 90.5 |

What is claimed:

1. A process for reducing nitrogen oxides and carbon monoxide in flue gases in the absence of injected ammonia or methane comprised of the following steps:
   (A) Preparing a bed of particulate catalyst material selected from the group consisting of expanded vermiculite, expanded perlite, and borosilicate glass wool,
   (B) Passing a flue gas through a bed of the catalyst material, whereby the nitrogen oxides are reduced to gaseous nitrogen and oxygen and the carbon monoxide is reduced to solid carbon and gaseous oxygen, said carbon being deposited on the surfaces of the particulate catalyst,
   (C) Exposing the particulate catalyst material having carbon on its surfaces to a high-temperature, oxidizing gas stream, whereby the solid carbon is converted to gaseous carbon dioxide and the catalyst material is returned to a condition suitable for re-exposure to flue gas.

2. A process according to claim 1, wherein the particulate catalyst material is expanded vermiculite.

3. A process according to claim 1, wherein the temperature of the flue gas is within the range 20° to 600° C.

4. A process according to claim 1, wherein the exposure temperature of the catalyst to the oxidizing gas stream is above 450° C.

5. A process according to claim 1, wherein the oxygen content of the oxidizing gas stream is 10 percent or more by weight.

6. A process for reducing nitrogen oxides and carbon monoxide in flue gases in the absence of injected ammonia or methane comprised of preparing a bed of expanded vermiculite, passing a flue gas having a temperature in the range 20° to 600° C. through this bed, whereby the nitrogen oxides are reduced to gaseous nitrogen and oxygen and the carbon monoxide is reduced to solid carbon and gaseous oxygen, said carbon being deposited on the surfaces of said catalyst, and exposing the catalyst with carbon on its surfaces to a gas stream having an oxygen content of at least 10 percent by weight at a temperature exceeding 450° C. to convert the carbon to carbon dioxide and to return the catalyst to a condition suitable for re-exposure to flue gas.

* * * * *